(12) United States Patent
Bolitsky et al.

(10) Patent No.: US 6,176,957 B1
(45) Date of Patent: Jan. 23, 2001

(54) METHOD OF REMOVING TEMPORARY TAPE FROM A LAMINATED ASSEMBLY WITH A COVERSHEET

(75) Inventors: Robert E. Bolitsky, Woodbury; Kathryn W. Cox, Inver Grove Heights, both of MN (US)

(73) Assignee: 3M Innovative Properties Company, St. Paul, MN (US)

( * ) Notice: Under 35 U.S.C. 154(b), the term of this patent shall be extended for 0 days.

(21) Appl. No.: 09/268,217

(22) Filed: Mar. 15, 1999

(51) Int. Cl.⁷ .................................................... B32B 31/00
(52) U.S. Cl. ...................... 156/230; 156/249; 156/299; 156/300
(58) Field of Search .................... 156/230, 249, 156/297, 299, 300; 52/384, 385, 388

(56) References Cited

U.S. PATENT DOCUMENTS

| | | |
|---|---|---|
| 2,412,693 * | 12/1946 | Pierson ................................. 156/157 |
| 3,890,185 | 6/1975 | Umazume . |
| 3,899,860 | 8/1975 | Newell . |
| 4,089,722 * | 5/1978 | Holoubek ............................. 156/235 |
| 4,406,099 | 9/1983 | Barrett . |
| 4,802,946 | 2/1989 | Mason . |
| 4,853,062 | 8/1989 | Gartland . |
| 5,112,882 | 5/1992 | Babu et al. . |
| 5,190,087 | 3/1993 | Mike . |
| 5,194,310 | 3/1993 | Lenderink . |
| 5,445,696 | 8/1995 | Krawczyk . |
| 5,644,007 | 7/1997 | Davidson et al. . |
| 5,728,246 | 3/1998 | Ewaschuk . |
| 6,048,431 | 4/2000 | Clements et al. ..................... 156/247 |

FOREIGN PATENT DOCUMENTS

WO 98/55280    12/1998  (WO) .

OTHER PUBLICATIONS

Patent Abstracts of Japan, Publication No. 02307701, Dec. 20, 1990, Application Date May 23, 1989, Application No. 01129588, Inventor Tanigughi Noboru.

The Complete Manual of Wood Veneering, W. A. Lincoln, Linden Publishing Inc., Fresno, CA, 1984, pp. 99–171 and 278–283.

A Manual of Veneering, Paul Villard, Dover Publications, Inc., New York, 1975, pp 80–89.

* cited by examiner

*Primary Examiner*—Mark A. Osele
(74) *Attorney, Agent, or Firm*—James J. Trussell

(57) ABSTRACT

A method of using a coversheet to remove a plurality of pieces of temporary tape from a laminated assembly. In particular, a method of using a coversheet to remove a plurality of pieces of pressure sensitive adhesive tape from a laminated veneer assembly. The coversheet and the pressure sensitive adhesive tape are selected such that after application of heat and pressure during the veneer lamination process, the back of the tape bonds to the surface of the coversheet. After lamination, the coversheet is removed with the pieces of tape bonded thereto. In this manner, the large number of pieces of tape do not have to be removed individually.

34 Claims, 3 Drawing Sheets

METHOD OF REMOVING TEMPORARY TAPE FROM A LAMINATED ASSEMBLY WITH A COVERSHEET

TECHNICAL FIELD

The present invention relates generally to a method of using a coversheet to remove a plurality of pieces of temporary tape from a laminated assembly, and more particularly to a method of using a coversheet to remove a plurality of pieces of pressure sensitive adhesive tape from a laminated veneer assembly.

BACKGROUND OF THE INVENTION

A variety of tapes are used in the furniture industry in the assembly of composite wood panels having veneered surfaces. Complex versions of these composite wood panels are known as "fancy face" veneered surface panels. The current practice in the furniture industry is to assemble furniture with thin wooden veneers covering a dimensionally stable, but cheaper core board, such as particle board. The decorative wood species desired by consumers, such as oak, maple, cherry, and others, are expensive and thus are most commonly used in the form of thin veneers about 0.03 inches (0.8 mm) thick. These veneer pieces are often arranged in a side-by-side relationship and fastened together to form a composite panel or veneer surface.

Taping the surface of the veneers is a critical part of the entire operation of veneering. It is at this point that the individual veneer portions are assembled into composites, thus determining the quality of the composite wood panel.

A typical method used to tape the surfaces of the veneer employs a nonpressure sensitive adhesive tape having a water-activated gum adhesive on a kraft paper backing. A worker pulls the gum side of the tape across a wetted sponge where it picks up enough moisture to become tacky. The worker then applies the tape to one of the veneers to be joined, and uses the free end of the tape to pull that piece into edge contact with a second piece. The tape is then rubbed down onto the second piece, and the process is repeated until the full surface is completed. As the gum of the tape loses water it becomes non-tacky, and forms a secure, permanent bond with the wood and the other layers of tape.

Many small pieces of tape may be required to hold the pieces of surface veneer in place on a typical piece of furniture. This is particularly the case where the joined veneers are small, the design is intricate, and mitered corners are made.

After the individual veneer portions are assembled in a pattern, it is laminated to the core board. The core board is run through a roll coater that applies glue to the surface of the board. The taped veneer assembly is positioned on the glued board and then pressed to the board, using either a cold press or a hot press. The time, pressure, and temperature of the lamination process are selected by those of skill in the art based on the adhesive type, the substrate, the veneer, and pressing apparatus used. If a cold press is used, the glue is commonly a ureaformaldehyde adhesive or a water-based vinyl adhesive, which typically cures at or slightly above normal room temperature. Cold press conditions generally are in excess of 100 psi ($6.9 \times 10^5$ Pa) for 45 minutes to 48 hours at room temperature. For a hot press, the glue is typically a synthetic resin adhesive or a ureaformaldehyde adhesive often supplied with various resin and catalyst combinations. Typical hot press lamination processes are at a temperature of 250° F. to 325° F. (121° C. to 163° C.), pressure of 75 psi to 250 psi (5.2 to $17.2 \times 10^5$ pa), for a time of 30 seconds to 10 minutes.

In some cases, a permanent liner is mounted on the pressing apparatus. This can be done, for example, to protect the pressing apparatus from the glue used to laminate the veneer to the core board which may ooze from the assembly onto the face of the press. It has been known to use, for example, a 0.010 inch (0.25 mm) thick polyester liner, such as Mylar available from E.I. du Pont de Nemours and Co., Wilmington, De. It has also been known to use 0.007 inch (0.18 mm) thick polyester sheet with an acrylic coating on one or both sides of the liner available as TRANSPET BT sheets from Transilwrap Company, Inc., Chicago, Ill. The liner is mounted in the apparatus such that when the apparatus is opened after pressing, the liner remains affixed of the pressing apparatus. The liner can be a single piece approximately the size of the press, or can be in roll form. After a large number of laminations such as occurring over several days up to about six months), an unacceptable amount of laminating glue may contaminate the liner, making it necessary to replace the liner, or expose fresh liner if in roll form.

Recently, veneer tapes have been developed that are manually removable after the pressing process. Removable veneer tapes can be peeled or lifted from the surface of the veneer prior to the sanding process. See U.S. patent application Ser. No. 08/867,890, filed on Jun. 3, 1997, Clements et al. (PCT publication WO98/55280), published on Dec. 10, 1998. Removable veneer tapes are commercially available as 3M tape #293 Cleanly Removable Veneer Tape from Minnesota Mining and Manufacturing Company, St. Paul, Minn.

The typical fancy face veneer consists of many veneer species, grain patterns, and shapes that are held in place with the veneer tape. As the complexity of the veneer faces increases, the greater the number of pieces of veneer tape required during assembly to hold the veneer pieces in alignment prior to the pressing process. The typical removal procedure used with a removable veneer tape would be to grasp the edge of each piece of veneer tape and to remove each piece of tape one at a time.

SUMMARY OF THE INVENTION

The invention described here provides a simple, economical, and time-saving method for removing a removable veneer tape from the veneer surface after lamination. Prior to the lamination process, the veneer face and pieces of removable veneer tape are covered with a coversheet. During the laminating process, the coversheet and the exposed side of the tape bond together with a bond that is greater than the bond of the adhesive to the veneer surface. After pressing, when the cover sheet is removed from the veneer face, most or all of the pieces of removable veneer tape are removed with the cover sheet.

While the inventive method described herein is particularly well-suited for applying wood veneer to a support or core board, the method is also useful for applying any type of facings to any suitable support that undergoes similar lamination processes. With the teachings of the present application, one of skill in the art will be able to select a veneer tape and coversheet combination that works well for the particular facing and lamination process of interest.

The present invention provides a method for bonding a plurality of facings to a substrate. The method includes the steps of: a) selecting a coversheet and a pressure sensitive adhesive tape, the tape having a first major surface and a layer of adhesive opposite the first major surface, the coversheet including a first major surface and a second major surface, the tape and cover sheet being selected such that after application of heat and pressure, the first major surface of the tape bonds to the first major surface of the coversheet; b) aligning a plurality of facings adjacent to one another, each of the facings including a first major surface and a second major surface; c) applying a plurality of pieces of the tape to the first major surfaces of the facings across the juncture between the facings; d) placing the plurality facings onto a substrate, with a layer of glue between the second major surface of the facings and the substrate; e) placing the coversheet over the first major surface of the facings and the first major surface of the pieces of tape, where the first major surface of the coversheet is facing the tape; f) applying heat and pressure to the second major surface of the coversheet to thereby laminate the facings to the substrate and to thereby bond the first major surface of at least 80% of the pieces of tape to the first major surface of the coversheet; g) removing the coversheet with the pieces of tape bonded thereto from the facings; and h) discarding the coversheet with the pieces of tape bonded thereto.

In a preferred embodiment of the above method, facings comprise wood veneer. In another aspect of this embodiment, the substrate comprises a wood support. In yet another aspect of this embodiment, the substrate comprises a core board. In another preferred embodiment of the above method, step f) comprises bonding at least 90% of the pieces of tape to the coversheet. In another aspect of this embodiment step f) comprises bonding 100% of the pieces of tape to the coversheet.

In another preferred embodiment of the above method, the coversheet comprises kraft paper. In yet another preferred embodiment of the above method, the coversheet comprises a polymeric film. In another aspect of this embodiment, the coversheet has a thickness of up to 0.004 inches. In yet another aspect of this embodiment, the coversheet includes a bonding layer on the first major surface. In another aspect of this embodiment, the coversheet includes an acrylic layer on the first major surface. In another preferred embodiment of the above method, the coversheet comprises polyester.

The present invention also provides a second method for bonding a plurality of facings to a substrate. This method includes the steps of: a) selecting a coversheet and a pressure sensitive adhesive tape, the tape having a first major surface and a layer of adhesive opposite the first major surface, the coversheet including a first major surface and a second major surface, the tape and cover sheet being selected such that after application of heat and pressure, the first major surface of the tape bonds to the first major surface of the coversheet; b) aligning a plurality of facings adjacent to one another, each of the facings including a first major surface and a second major surface; c) applying at least 25 pieces of the tape to the first major surfaces of the facings across the juncture between the facings; d) placing the plurality facings onto a substrate, with a layer of glue between the second major surface of the facings and the substrate; e) placing the coversheet over the first major surface of the facings and the first major surface of the pieces of tape, where the first major surface of the coversheet is facing the tape; f) applying heat and pressure to the second major surface of the coversheet to thereby laminate the facings to the substrate and to thereby bond the first major surface of at least 80% of the pieces of tape to the first major surface of the coversheet; and g) removing the coversheet with the pieces of tape bonded thereto from the facings.

In a preferred embodiment of the above method, the facings comprise wood veneer. In another aspect of this embodiment, the substrate comprises a wood support. In yet another aspect of embodiment, the substrate comprises a core board. In another preferred embodiment of the above method, the method further includes step h) of discarding the coversheet with the pieces of tape bonded thereto. In another aspect of the above method, step f) comprises bonding at least 90% of the pieces of tape to the coversheet. In yet another aspect of the above method, step f) comprises bonding 100% of the pieces of tape to the coversheet. In still another aspect of the above method, the coversheet comprises kraft paper.

In yet another preferred embodiment of the above method, the coversheet comprises a polymeric film. In another preferred embodiment of the above method, the coversheet comprises polyester. In still another preferred embodiment of the above method, the coversheet has a thickness of up to 0.004 inches. In another preferred embodiment of the above method, the coversheet includes a bonding layer on the first major surface. In yet another preferred embodiment of the above method, the coversheet includes an acrylic layer on the first major surface.

The present invention also provides a third method for bonding a plurality of facings to a substrate. This method includes the steps of: a) selecting a coversheet and a pressure sensitive adhesive tape, the tape having a first major surface and a layer of adhesive opposite the first major surface, the coversheet including a first major surface, a second major surface, and a bonding layer on the first major surface, the tape and cover sheet being selected such that after application of heat and pressure, the first major surface of the tape bonds to the first major surface of the coversheet; b) aligning a plurality of facings adjacent to one another, each of the facings including a first major surface and a second major surface; c) applying a plurality of pieces of the tape to the first major surfaces of the facings across the juncture between the facings; d) placing the plurality facings onto a substrate, with a layer of glue between the second major surface of the facings and the substrate; e) placing the coversheet over the first major surface of the facings and the first major surface of the pieces of tape, where the first major surface of the coversheet is facing the tape; f) applying heat and pressure to the second major surface of the coversheet to thereby laminate the facings to the substrate and to thereby bond the first major surface of at least 80% of the pieces of tape to the first major surface of the coversheet; and g) removing the coversheet with the pieces of tape bonded thereto from the facings.

In a preferred embodiment of the above method, the facings comprise wood veneer. In another aspect of this embodiment, the substrate comprises a wood support. In yet another aspect of this embodiment, the substrate comprises a core board. In still another aspect of this embodiment, the coversheet comprises polyester. In another aspect of this embodiment, the coversheet has a thickness of up to 0.004 inches. In yet another aspect of this embodiment, the bonding layer comprises acrylic. In yet another preferred embodiment of the above method, the method further includes step h) of discarding the coversheet with the pieces of tape bonded thereto. In another preferred embodiment of the above method, step f) comprises bonding at least 90% of the pieces of tape to the coversheet. In yet another preferred embodiment of the above method, step f) comprises bonding 100% of the pieces of tape to the coversheet.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

Figure 1:
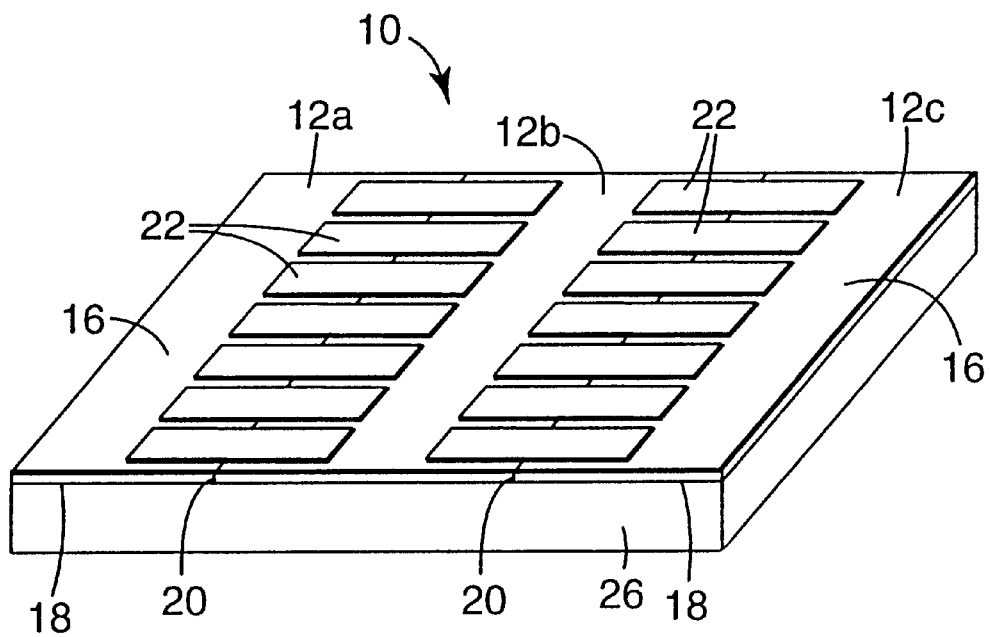
FIG. 1 is an isometric view of several pieces of veneer taped together for lamination to a core board.

FIG. 1 illustrates a veneer assembly 10 placed on a substrate 26 with a layer of glue, ready for lamination by application of pressure or pressure and heat. Substrate 26 is typically either a larger single piece of veneer-like substrate, referred to herein as a support, or a thicker substrate such as a core board. When substrate 26 is a support, the resulting two-ply assembly is itself later bonded to a thicker core board. The thicker core board is typically a sturdy structural element of the final piece of furniture or the like. A plurality of veneers or other facings are aligned adjacent to one another. The veneer assembly 10 includes any desired number of pieces of veneer 12a, 12b, 12c, etc., abutted to one another along junctures 20. A large number of pieces of veneer tape 22 are applied to the first major surfaces 16 of the facings or veneers 12 across the juncture 20 between the facings to hold the pieces of veneer 12 in position. Optionally, additional pieces of veneer tape 22 (not illustrated) may be positioned lengthwise along the juncture, either over or between the initial short pieces crossing the juncture.

The pieces of veneer can be made of any of a variety of woods, which include, but are not limited to, oak, maple, pine, cherry, walnut, ash, mahogany, teak, birch and hickory. The thickness of the veneer typically ranges from about 0.2 to 0.4 inches (0.6 to 0.9 mm), with most veneers being approximately 0.03 inches (0.8 mm) thick.

While the inventive method described herein is particularly well-suited for applying wood veneer to a support or core board, the method is also useful for applying any type of facings 12 to any suitable support 26 that undergoes similar lamination processes. With the teachings of the present application, one of skill in the art will be able to select a veneer tape and coversheet combination that works well for the particular facing and lamination process of interest.

The plurality of taped facings 12 are placed onto a substrate 26, with a layer of glue between the second major surface 18 of the facings and the substrate. For a hot press, the glue is typically a synthetic resin adhesive or a urea-formaldehyde adhesive often supplied with various resin and catalyst combinations.

Figure 2:
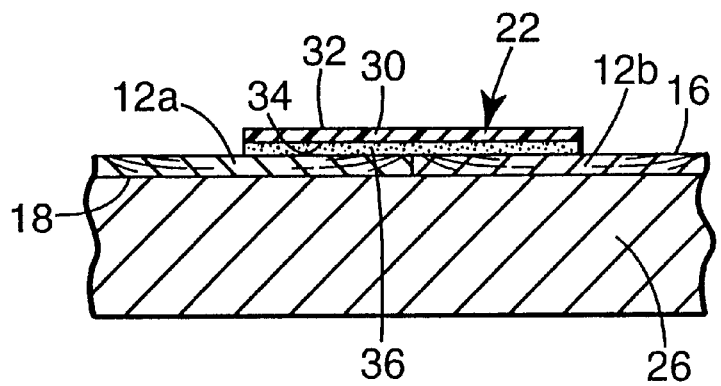
FIG. 2 is a cross-sectional view of a portion of the assembly of FIG. 1.

FIG. 2 is an enlarged cross-sectional view of the veneer tape 22 adhered to the first major surface 16 of each of the veneer pieces 12a and 12b. The first and second pieces of veneer each include an exposed first major surface 16 and a second major surface 18 opposite the first major surface and facing the substrate 26. The veneer tape 22 includes a backing 30 and a layer of adhesive 36 on the second major surface 34. Tape 22 also includes a first major surface 32 opposite the adhesive 36. The layer of adhesive 36 adheres to the first major surfaces 16 of the veneer pieces.

One preferred embodiment of veneer tape 22 is cleanly removable from the veneer after the lamination process. With this embodiment, the backing and substantially all of the adhesive can be peeled from the veneer after the lamination process. Such tapes are disclosed in U.S. patent application Ser. No. 08/867,890, filed on Jun. 3, 1997, Clements et al., the entire disclosure of which is incorporated herein (PCT publication WO98/55280, published on Dec. 10, 1998). Such a cleanly removable tape can include a rubber-based adhesive on a 3.5 to 4.0 mil thick paper flatback backing that is saturated with a styrene butadiene rubber saturant and barrier coated with an acrylic latex elastomer (available from Kimberly Clark as C-91502/C-64444), with an acrylic release coating on the first surface of the tape 32. One preferred embodiment of a cleanly removable veneer tape is commercially available as 3M Tape #293 Cleanly Removable Veneer Tape from Minnesota Mining and Manufacturing Company, St. Paul, Minn.

A second preferred embodiment of veneer tape 22 is one in which the backing 30 separates from the adhesive 36 when peeled from the veneer assembly, leaving substantially all of the adhesive 36 on the veneer assembly. A third preferred embodiment is one in which the adhesive 36 undergoes a cohesive separation when the backing 30 is peeled from the veneer assembly, leaving a significant amount of the adhesive on each of the backing and the veneer assembly. Preferred embodiments of the latter two removable veneer tapes are disclosed in U.S. patent application Ser. No. 09/268,218 Attorney docket number 54609USA1A, Veneer Tape and Method of Use, filed on even date herewith, the entire disclosure of which is incorporated herein.

Figure 3:
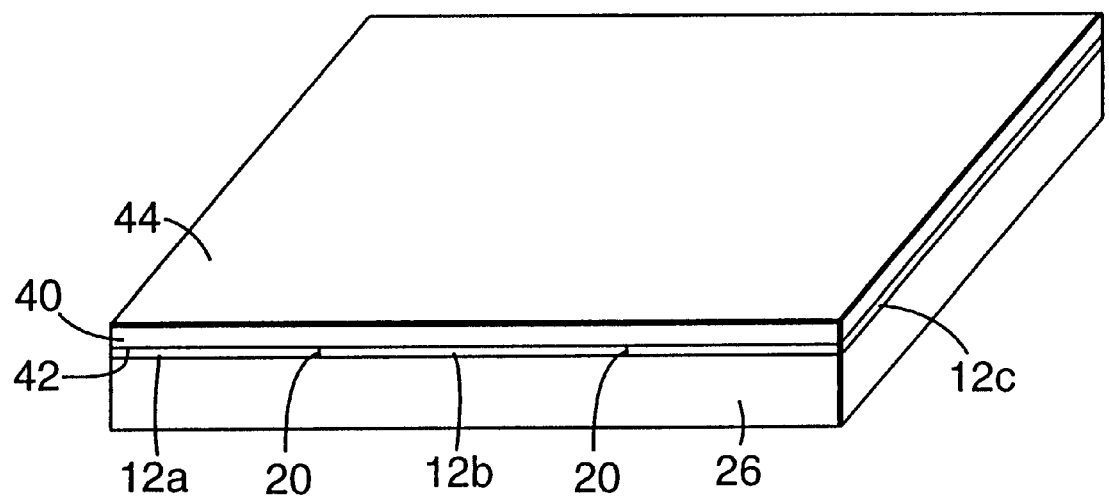
FIG. 3 is an isometric view of the assembly of FIG. 3 with a coversheet placed thereon in accordance with the present invention.
Figure 4:
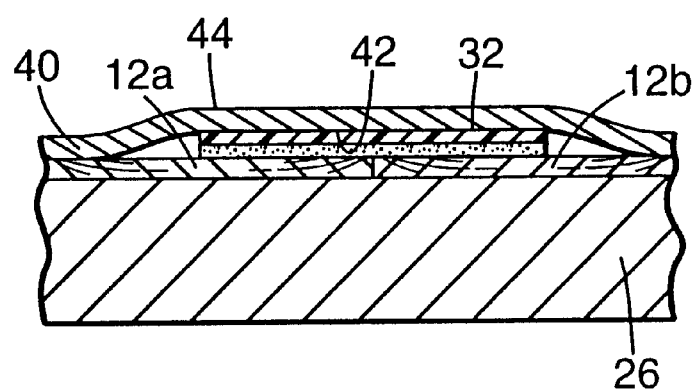
FIG. 4 is a cross-sectional view of a portion of the assembly of FIG. 3.

After the veneer pieces are taped together, glue is applied to the surface of the substrate 26, typically by a roll coater. The taped veneer assembly is then placed over the layer of glue on the substrate 26. As illustrated in FIGS. 3 and 4, coversheet 40 is then placed over the taped veneer assembly. Coversheet 40 has first major surface 42 in contact with the first surface 32 of the veneer tape pieces 22 and with the first surface 16 of the pieces of veneer 12. Coversheet 40 should be sized and positioned to at least cover each of the pieces of tape 22, and more preferably to cover the entire surface of the taped veneer pieces. This assembly is then laminated by a suitable lamination apparatus. The time, pressure, and temperature of the lamination process are selected by those of skill in the art based on the adhesive type, the substrate, the veneer, and pressing apparatus used. For a hot press, the glue is typically a synthetic resin adhesive or a urea-formaldehyde adhesive often supplied with various resin and catalyst combinations. Typical hot press lamination processes are at a temperature of 250° F. to 250° F. (121° C. to 163° C.), with two preferred ranges being 250–280° F. (121–138° C.) and 300–325° F. (149–163° C.), pressure of 75 psi to 250 psi (5.2 to 17.2×10$^5$ Pa), for a time of 30 seconds to 10 minutes.

The application of heat and pressure to the second major surface 44 of the coversheet laminates the facings 12 to the substrate 26 and also bonds the first major surface 32 of the pieces of tape 22 to the first major surface 42 of the coversheet.

Figure 5:
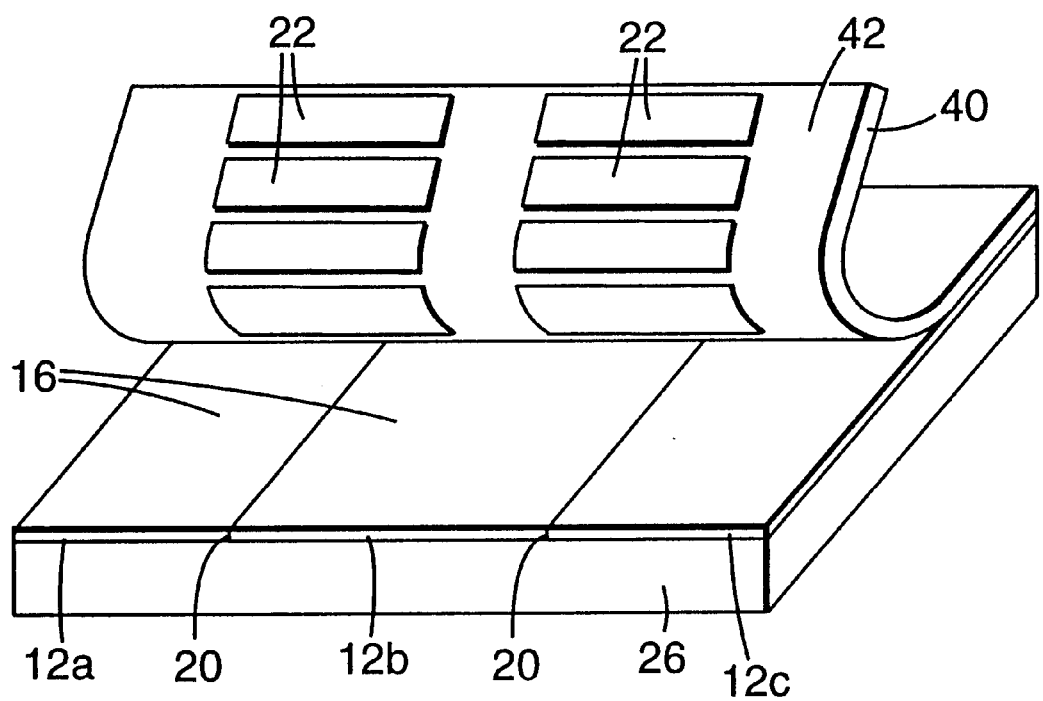
FIG. 5 is an isometric view of the assembly of FIG. 4 after lamination, with the coversheet partially removed.

After the lamination process, the assembly is allowed to cool. As illustrated in FIG. 5, the coversheet 40 is then grasped and peeled or pulled from the veneer assembly. During the lamination process, the veneer tape pieces 22 develop a bond to the first major surface 42 of the coversheet. The bond between the tape and the coversheet is stronger than the bond between the tape and the veneer.

Therefore, the pieces of tape 22 transfer to the coversheet when the coversheet is removed. Preferably at least 80% of the pieces of tape transfer, more preferably at least 90%, and most preferably 100% of the pieces of tape transfer. The coversheet 40 can then be conveniently discarded with the pieces of veneer tape bonded thereto. This provides the advantages of not having to peel the many tape pieces individually from the veneer or other facing, and not having to remove the tape pieces from the coversheet for re-use. Because of the ease of removal possible with the coversheet, the present method is particularly well suited for assemblies having a large number of pieces of tape, for example 25 or more pieces. However, the inventive method is also useful for assemblies with smaller numbers of pieces of tape, where the time saving is still beneficial, if not as great as with larger numbers of pieces of tape.

When the cleanly removable tape described above is used, the backing 30 and substantially all of the adhesive 36 are removed with the coversheet. When using second embodiment of the tape 22 described above, the backing transfers to the coversheet, and substantially all of the adhesive remains on surface 16 of the pieces of veneer. When using the third embodiment of the tape described above, the backing transfers to the coversheet, while a significant amount of adhesive remains on each of the backing and the surface of the veneer. In any case, the laminated assembly is now ready for sanding and any other desired finishing.

The coversheet 40 and pressure sensitive adhesive tape 22 are selected such that after application of heat and pressure, the first major surface of the tape bonds to the first major surface of the coversheet. In some cases, there can be a component on either or both of the tape backing and the coversheet that under heat and pressure develops a bond between the tape and the coversheet. For example, a barrier coat applied to a paper tape backing may develop such a bond. Furthermore, a component may be intentionally added to the tape backing to create or enhance the bond. The coversheet 40 may have a bonding layer on the first major surface that develops a bond with the tape. For example, an acrylic layer may be present on the coversheet to develop a bond with the tape backing. Alternatively, a low coating weight of an adhesive, such as the laminating glues described above, may be used as the bonding layer on the first major surface of the coversheet.

One preferred embodiment of coversheet 40 comprises a polymeric coversheet. More preferably, the coversheet comprises polyester, such as that available as MYLAR polyester sheets from E.I. duPont de Nemours and Co., Wilmington, De. The coversheet should be thick and strong enough to remain intact during the lamination process and to remain intact when peeling off the coversheet with the tape pieces bonded thereto. It is also preferable that the coversheet be thin enough that it is economical to discard the coversheet after each use. Preferred polyester coversheets are from 0.001 to 0.010 inches thick (0.025 to 0.25 mm), with sheets approximately 0.002 to 0.004 thick (0.05 to 0.1 mm) being most preferred for providing sufficient strength at low cost. Optionally, the coversheet can include a coating on the first side 42 that develops a bond to the tape backing under heat and pressure. One such coated polyester coversheet is available commercially as TRANSPET BT sheets from Transilwrap Company, Inc., Chicago Ill. Another preferred coversheet is a kraft paper coversheet, preferably approximately 0.009 to 0.010 inches thick (0.23 to 0.25 mm) such as is available from Anchor Paper.

The operation of the present invention will be further described with regard to the following detailed examples.

These examples are offered to further illustrate the various specific and preferred embodiments and techniques. It should be understood, however, that many variations and modifications may be made while remaining within the scope of the present invention.

EXAMPLE 1

A removable veneer tape was prepared by coating a poly(alpha-olefin) adhesive onto a flatback backing. The following components were mixed together using a Plasticorder™ mixer (available from C. W. Brabender Instruments, Inc., South Hackensack, N.J.) and a Rheomix Model 3000 bowl (available from Haake, Inc., Saddlebrook, N.J.) to make the poly(alpha-olefin) adhesive: 78 pbw of poly(1-octene) prepared as described in U.S. Pat. No. 5,644,007 and having an inherent viscosity (IV) of 1.6 dL/g (as measured in toluene at about 82° F. (28° C.) at a concentration of 0.1 grams/dL using a #100 Cannon-Fenske viscometer tube) and a polydispersity index of about 4.3 (as measured in toluene at 82° F. (28° C.) at a concentration of 0.25 grams/dL using polystyrene calibration standards), 22 pbw of Arkon™ P115 hydrocarbon tackifying resin (available from Arakawa Forest Chemical Industries, Chicago, Ill.), and 0.125 pbw of 2,4-bis(trichloromethyl)-6-(4methoxyphenyl)-sym-triazine photoinitiator. The two bowl plates were both set at 302°0 F. (150° C.), and the mixing speed was set at 25 revolutions per minute (rpm). After preheating the bowl plates to 302° F. (150° C.), the poly(1-octene) was added first (t=0 minutes) and after mixing for 2 minutes (t=2 minutes) the hydrocarbon tackifying resin was added slowly over a period of 1 minute. Then a t=3 minutes the photoinitiator was added and the composition mixed for an additional 4 minutes.

After cooling to room temperature the adhesive composition was extruded using a Haake single screw extruder between a 0.003 inch (76.2 $\mu$m) thick silicone-treated paper release liner (which was introduced around an upper rubber roller) and a 0.004 inch (102 $\mu$m) thick SBR (styrene-butadiene rubber) saturated flatback paper backing (available as CTD Flatback Grade Spec 2124PO, Type C-91502 from Kimberly-Clark Company, Roswell, Ga.) (which was introduced around the lower, chrome roll) to give a coating weight of 20.1 gm$^2$. The paper backing had been previously coated on one side with a conventional solvent-based acrylic low adhesion backsize layer. The extrudate was coated, on the side of the paper backing opposite that having the low adhesion backsize layer, at a coating weight of 0.8 $\mu$m$^2$. The resulting tape with liner was then wound up and stored for further processing.

Next, the coated tape was unwound, the paper release liner removed and the adhesive crosslinked by exposure, under a nitrogen atmosphere, to 311 milliJoules/centimeter$^2$ (mJ/cm$^2$) of energy (in National Institute of Standards and Testing (NIST) units), as measured by a UVIMAP™ Model UM365L-S sensing device available from Electronic Instrumentation and Technology, Inc.; Sterling, Va. under the trade designation "UVIMAP Model UM365L-S") (the calibration standard for UV energy was MIL-STD-45662A), using two medium pressure, high intensity mercury lamps to give a tape of the invention.

This tape construction was used to assemble 10 fancy face veneer panels. For each of these 10 veneer assemblies, approximately 50 to 100 pieces of veneer comprising the following wood types were assembled: mahogany, satinwood, zebrawood, and black dyed obeche wood. On each of the ten assemblies, approximately 350–700 pieces of veneer tape were applied, depending on the number of pieces of veneer being held in place. A 0.007 inch (0.18 mm) thick polyester coversheet having an acrylic coating thereon (TRANSPET BT sheets from Transilwrap Company, Inc., Chicago Ill. was placed over each taped assembly prior to pressing at 200 psi for four minutes at 315° F. (157° C.). After the pressing process, the assembly was allowed to cool for approximately 1 to 3 minutes, to approximately room temperature up to about 120° F. The cover sheet was lifted from the taped assemblies and approximately 95%–99% of the veneer tape pieces used in each assembly were removed along with the cover sheet.

EXAMPLE 2

The tape construction described in Example 1 above was used to prepare five taped assemblies of a simple cherry wood veneer. Each assembly had four pieces of veneer and approximately 40 to 50 pieces of veneer tape. The cover sheets used were 0.009 to 0.010 inch (0.23 to 0.25 mm) thick Kraft paper. After pressing at 200 psi for four minutes at 315° F. (157° C.), the assemblies were allowed to cool approximately 1 to 3 minutes to approximately room temperature to about 120° F. The Kraft paper coversheets were removed from each of the veneer assemblies along with 100% of the veneer tape pieces.

The tests and test results described above are intended solely to be illustrative, rather than predictive, and variations in the testing procedure can be expected to yield different results.

The present invention has now been described with reference to several embodiments thereof. The foregoing detailed description and examples have been given for clarity of understanding only. No unnecessary limitations are to be understood therefrom. All patents and patent applications cited herein are hereby incorporated by reference. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. A method for bonding a plurality of facings to a substrate, the method comprising the steps of:
   a) selecting a coversheet and a pressure sensitive adhesive tape, the tape having a first major surface and a layer of adhesive opposite the first major surface, the coversheet including a first major surface and a second major surface, the tape and cover sheet being selected such that after application of heat and pressure, the first major surface of the tape bonds to the first major surface of the coversheet;
   b) aligning a plurality of facings adjacent to one another, each of the facings including a first major surface and a second major surface;
   c) applying a plurality of pieces of the tape to the first major surfaces of the facings across the juncture between the facings;
   d) placing the plurality facings onto a substrate, with a layer of glue between the second major surface of the facings and the substrate;
   e) placing the coversheet over the first major surface of the facings and the first major surface of the pieces of tape, wherein the first major surface of the coversheet is facing the tape;
   f) applying heat and pressure to the second major surface of the coversheet to thereby laminate the facings to the substrate and to thereby bond the first major surface of at least 80% of the pieces of tape to the first major surface of the coversheet;
   g) removing the coversheet with the pieces of tape bonded thereto from the facings; and
   h) discarding the coversheet with the pieces of tape bonded thereto.

2. The method of claim 1, wherein the facings comprise wood veneer.

3. The method of claim 2, wherein the substrate comprises a wood support.

4. The method of claim 2, wherein the substrate comprises a core board.

5. The method of claim 1, wherein step f) comprises bonding at least 90% of the pieces of tape to the coversheet.

6. The method of claim 5, wherein step f) comprises bonding 100% of the pieces of tape to the coversheet.

7. The method of claim 1, wherein the coversheet comprises kraft paper.

8. The method of claim 1, wherein the coversheet comprises a polymeric film.

9. The method of claim 8, wherein the coversheet has a thickness of up to 0.004 inches.

10. The method of claim 8, wherein the coversheet includes a bonding layer on the first major surface.

11. The method of claim 8, wherein the coversheet includes an acrylic layer on the first major surface.

12. The method of claim 1, wherein the coversheet comprises polyester.

13. A method for bonding a plurality of facings to a substrate, the method comprising the steps of:
   a) selecting a coversheet and a pressure sensitive adhesive tape, the tape having a first major surface and a layer of adhesive opposite the first major surface, the coversheet including a first major surface and a second major surface, the tape and cover sheet being selected such that after application of heat and pressure, the first major surface of the tape bonds to the first major surface of the coversheet;
   b) aligning a plurality of facings adjacent to one another, each of the facings including a first major surface and a second major surface;
   c) applying at least 25 pieces of the tape to the first major surfaces of the facings across the juncture between the facings;
   d) placing the plurality facings onto a substrate, with a layer of glue between the second major surface of the facings and the substrate;
   e) placing the coversheet over the first major surface of the facings and the first major surface of the pieces of tape, wherein the first major surface of the coversheet is facing the tape;
   f) applying heat and pressure to the second major surface of the coversheet to thereby laminate the facings to the substrate and to thereby bond the first major surface of at least 80% of the pieces of tape to the first major surface of the coversheet; and
   g) removing the coversheet with the pieces of tape bonded thereto from the facings.

14. The method of claim 13, wherein the facings comprise wood veneer.

15. The method of claim 14, wherein the substrate comprises a wood support.

16. The method of claim 14, wherein the substrate comprises a core board.

17. The method of claim 13, comprising the further step h) of discarding the coversheet with the pieces of tape bonded thereto.

18. The method of claim 13, wherein step f) comprises bonding at least 90% of the pieces of tape to the coversheet.

19. The method of claim 13, wherein step f) comprises bonding 100% of the pieces of tape to the coversheet.

20. The method of claim 13, wherein the coversheet comprises kraft paper.

21. The method of claim 13, wherein the coversheet comprises a polymeric film.

22. The method of claim 21, wherein the coversheet comprises polyester.

23. The method of claim 21, wherein the coversheet has a thickness of up to 0.004 inches.

24. The method of claim 21, wherein the coversheet includes a bonding layer on the first major surface.

25. The method of claim 21, wherein the coversheet includes an acrylic layer on the first major surface.

26. A method for bonding a plurality of facings to a substrate, the method comprising the steps of:
   a) selecting a coversheet and a pressure sensitive adhesive tape, the tape having a first major surface and a layer of adhesive opposite the first major surface, the coversheet including a first major surface, a second major surface, and a bonding layer on the first major surface, the tape and cover sheet being selected such that after application of heat and pressure, the first major surface of the tape bonds to the first major surface of the coversheet;
   b) aligning a plurality of facings adjacent to one another, each of the facings including a first major surface and a second major surface;
   c) applying a plurality of pieces of the tape to the first major surfaces of the facings across the juncture between the facings;
   d) placing the plurality facings onto a substrate, with a layer of glue between the second major surface of the facings and the substrate;
   e) placing the coversheet over the first major surface of the facings and the first major surface of the pieces of tape, wherein the first major surface of the coversheet is facing the tape;
   f) applying heat and pressure to the second major surface of the coversheet to thereby laminate the facings to the substrate and to thereby bond the first major surface of at least 80% of the pieces of tape to the first major surface of the coversheet; and
   g) removing the coversheet with the pieces of tape bonded thereto from the facings.

27. The method of claim 26, wherein the facings comprise wood veneer.

28. The method of claim 27, wherein the substrate comprises a wood support.

29. The method of claim 27, wherein the substrate comprises a core board.

30. The method of claim 27, wherein the coversheet comprises polyester.

31. The method of claim 27, wherein the coversheet has a thickness of up to 0.004 inches.

32. The method of claim 27, wherein the bonding layer comprises acrylic.

33. The method of claim 26, wherein step f) comprises bonding at least 90% of the pieces of tape to the coversheet.

34. The method of claim 26, wherein step f) comprises bonding 100% of the pieces of tape to the coversheet.

\* \* \* \* \*

UNITED STATES PATENT AND TRADEMARK OFFICE
CERTIFICATE OF CORRECTION

PATENT NO. : 6,176,957  
DATED : January 23, 2001  
INVENTOR(S) : Robert E. Bolitsky et al.

Page 1 of 1

It is certified that error appears in the above-identified patent and that said Letters Patent is hereby corrected as shown below:

Column 6,  
Line 51, the second occurrence of "250°F." should read as -- 325°C --.

Column 8,  
Line 26, "(4methoxyphenyl)" should read as -- (4-methoxyphenyl) --.  
Line 27, delete "0" after "302°".  
Line 49, "$\mu m^2$" should read as -- $g/m^2$ --.

Signed and Sealed this

Twenty-fifth Day of December, 2001

Attest:

Attesting Officer

JAMES E. ROGAN  
*Director of the United States Patent and Trademark Office*